US006174558B1

(12) United States Patent
Lamptey et al.

(10) Patent No.: US 6,174,558 B1
(45) Date of Patent: Jan. 16, 2001

(54) METHOD FOR INCREASING BREAST MEAT YIELDS IN POULTRY

(75) Inventors: Arlene T. Lamptey, Des Moines; Friedhelm Brinkhaus, Urbandale; John A. Greaves, Ankeny; Eddy A. Fontana, West Des Moines, all of IA (US); Gary M. Smith, Nocona, TX (US)

(73) Assignee: Kemin Industries, Inc., Des Moines, IA (US)

( * ) Notice: Under 35 U.S.C. 154(b), the term of this patent shall be extended for 0 days.

(21) Appl. No.: 09/271,757

(22) Filed: Mar. 17, 1999

(51) Int. Cl.$^7$ .................................................. A23K 1/00
(52) U.S. Cl. ...................... 426/635; 426/630; 426/807; 426/53; 426/54
(58) Field of Search ................. 426/53, 54, 635, 426/630, 807

(56) References Cited

U.S. PATENT DOCUMENTS 3,657,421 * 4/1972 Berger .................................. 424/122
5,356,810 * 10/1994 Fleno et al. ......................... 435/225.1
5,459,162 * 10/1995 Saxton .................................. 514/499

FOREIGN PATENT DOCUMENTS

9522601 * 8/1995 (WO) .
9820750 * 5/1998 (WO) .

* cited by examiner

Primary Examiner—Chhaya D. Sayala
(74) Attorney, Agent, or Firm—Kent A. Herink; Daniel A. Rosenberg; Davis, Brown, Koehn, Shors & Roberts, P.C.

(57) ABSTRACT

A poultry feed composition including protein, vitamins and minerals, and a source of carbohydrates from the group consisting of soybean meals and corn supplemented with an α-galactosidase that catalyzes the degradation of the galactoside. The addition of the α-galactosidase increases the ratio of gain to feed, increases the amount of white meat, or decreases the amount of fat deposited during growth of a chicken fed the feed composition, relative to the chicken fed on an identical feed composition absent the α-galactosidase.

12 Claims, 2 Drawing Sheets

FIGURE 1: FEED CONVERSION OVER TIME
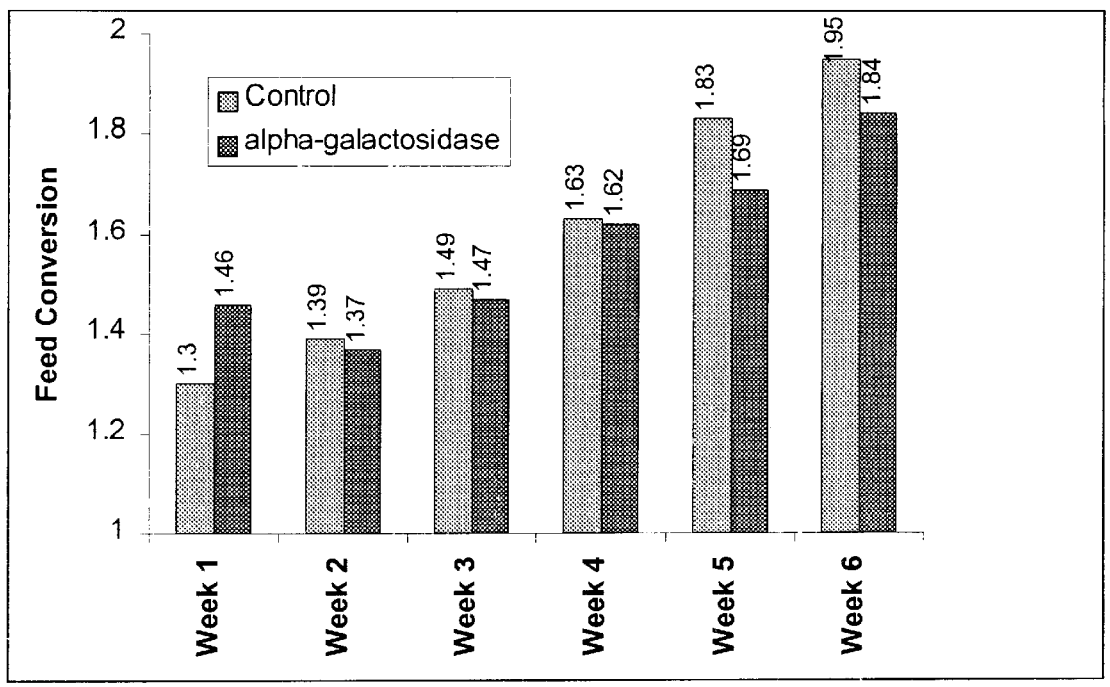

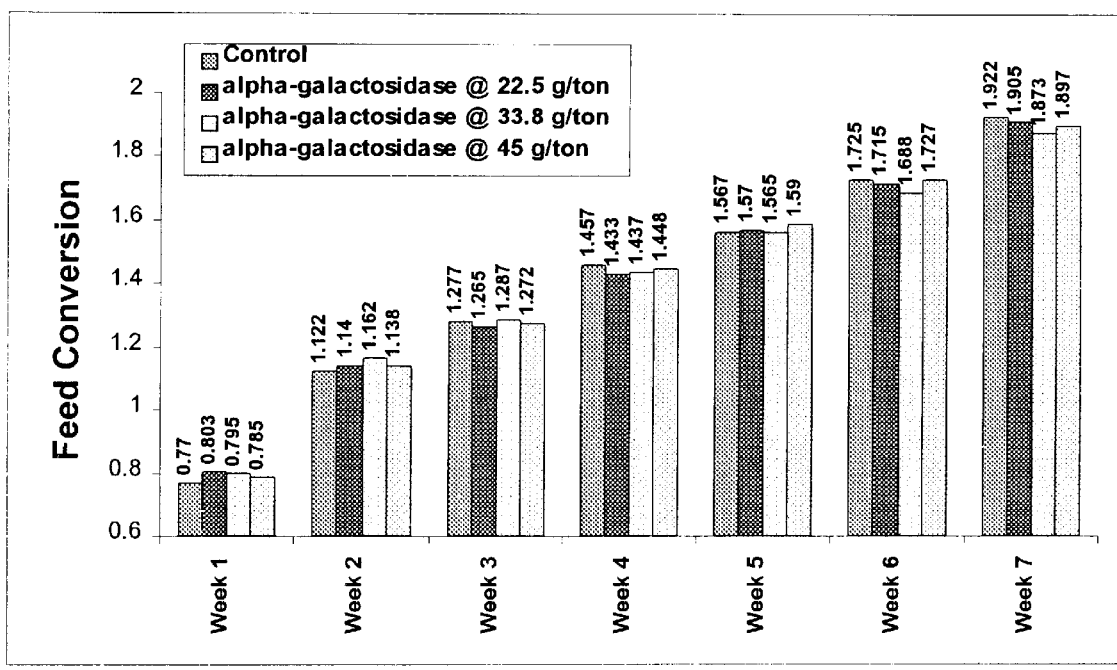
FIGURE 2: FEED CONVERSIONS OVER TIME

METHOD FOR INCREASING BREAST MEAT YIELDS IN POULTRY

BACKGUOUND OF THE INVENTION

1. Field of the Invention

The invention relates generally to a method for increasing the breast meat yield of poultry and, more specifically, to the use of the enzyme α-galactosidase as a feed supplement to increase the yield of breast meat and decrease the fat deposition in broiler chickens fed a commercial corn/soybean meal diet.

2. Background of the Prior Art

Many grains such as wheat and barley that are typically used as feed ingredients for broiler feed contain up to 10% of a fiber fraction consisting of non-starch carbohydrates. Chickens, like other animals, are not able to digest these non-starch carbohydrates since they lack the digestive enzymes in their digestive systems. Use of exogenously supplied enzymes in wheat and barley based diets is common practice and is recognized to increase feed conversion, and frequently also body weight, as it allows the animal to utilize the otherwise non-digestible fiber portion of the diet. Enzymes used to improve the digestibility of wheat and barley are cellulases, pectinases, α-amylases and arabinoxylanases for wheat and β-glucanases for barley.

The soybean meal component of a corn/soybean meal diet, and to a lesser extent the corn fraction of such a diet, contains typically non-starch polysaccharides such as galactosides which also cannot be digested by the chicken. Chickens lack the enzyme α-galactosidase, which would allow the animal to break down these non-starch polysaccharides into sugar molecules which then can be used by the animal. However, the chicken small intestinal tract houses a microbial flora that is reported to take up and utilize the galactoside fraction of soybean meal, competing not only for the energy content with the animal, but also causing secondary problems such as flatus and diarrhea.

Efforts have been made by others to produce an enzyme which will liberate nutrients from the non-digestible components of corn/soybean base diets. Results from these efficacy trials have been inconsistent. Accordingly, research on the use of enzymes such as cellulases, glucanases, xylanases, mannanases and also α-galactosidase has led to the conclusion that these enzymes improve feed conversion as well as increase body weights, but no effect on increased white meat or decreased fat deposition has been reported.

SUMMARY OF THE INVENTION

The invention consists of a method for increasing feed conversion, increasing the yield of white meat, and decreasing the deposition of fat in poultry through the addition of α-galactosidase to a commercial corn/soybean meal diet. The supplement is fed at a rate of between about 22.5 g/ton α-galactosidase and about 75 g/ton α-galactosidase of a commercial corn/soybean meal diet, and preferably between about 30 g/ton and about 45 g/ton. Feed conversion is increased between about 1% and about 10%, breast yields are increased by between about 1% and about 10%, and decrease in fat deposition is between about 1% and about 20%.

An object of the present invention is to provide a method for increasing the yield of white meat in poultry.

Another object of the present invention is to provide a method for decreasing the deposition of fat in poultry.

A further object of the invention is to provide a feed supplement including α-galactosidase which when added to a commercial corn/soybean meal diet improves the feed conversion, reduces the deposition of fat, and increases the yield of breast meat in poultry.

These and other objects of the invention will be made apparent to persons skilled in the art upon a review of this specification, the associated figures, and the appended claims.

BRIEF DESCRIPTION OF THE DRAWINGS

FIG. 1 is a graphical representation of feed conversion data from a feeding trial using a control diet and diets supplemented with α-galactosidase at three different concentrations.

FIG. 2 is a graphical representation of feed conversion data from a second feeding trial using a control diet and diets supplemented with α-galactosidase at three different concentrations.

DETAILED DESCRIPTION OF A PREFERRED EMBODIMENT

Several studies were conducted to determine the effects of α-galactosidase, for broilers on body weight, feed conversion, daily gain, mortality, and carcass measurements of broilers fed corn/soybean based diets. Diets were formulated to be consistent with commercial practices, and consisted of a starter, grower, and finisher rations. The protocols used a control diet without supplementation and the control diet supplemented with an enzyme supplement that consists of 30% α-galactosidase by weight. Although the specific product used for α-galactosidase supplementation in the Examples comprised α-galactosidase combined with a mixture of other enzymes, including a protease and cell wall enzymes, these other enzymes can be omitted without substantially affecting the results and the particular additional enzymes for inclusion with α-galactosidase, as well as the rates of inclusion, may be selected by those skilled in the art. The enzyme supplement is added to increase the amount of α-galactosidase in the diet by between a minimum of 22.5 g/ton and a maximum of 75 g/ton, with a preferred range of between about 30 g/ton and about 45 g/ton.

An alternative measurement of the rate of inclusion of α-galactosidase is by determining the units ($\mu$moles p-nitrophenol/minute/ml) of α-galactosidase activity using, a suitable assay. The data in this specification were collected using an assay based on the hydrolysis by α-galactosidases of the terminal, non-reducing α-galactose residues in α-galactosides including galactose oligosaccharides. A substrate of 1.2 mM p-nitrophenol α-galactopyranoside is created by dilution with 0.05 M sodium acetate buffer and incubated for 5 minutes at 37° C. A dilute solution of the product is mixed with the 0.05 M sodium acetate buffer and the mixture is added to the substrate and incubated for 15 minutes at 37° C. A stop reagent of 0.0625 M borax-NaOH buffer is added. Release of p-nitrophenol from the hydrolysis of p-nitrophenol α-galactopyranoside is measured at 405 nm in a spectrophotometer. Using this method, supplementation is done to increase the amount of α-galactosidase in the diet by between a minimum of 15,700 units/ton and a maximum of 52,500 units/ton, with a preferred range of between about 21,000 units/ton and about 31,500 units/ton. Data support increases in feed conversion of between 1% and 10%, increases in breast meat of between 1% and 10%, and decreases in fat deposition (as measured by the fat pad deposited below the skin over the breast) of between 1% and 20%.

Results from these studiei indicate α-galactosidase for broilers improves performance of broilers, and may modify carcass composition via nutrient partitioning. Breast meat in the U.S. commands a premium price. Any increase in the yield of breast meat provides integrators with an immediate windfall on the most valuable portion of a chicken. It is also possible that α-galactosidase could form part of a comprehensive nutritional program to produce "leaner" broilers. From a nutritional point of view, the protein/amino acid liberation induced by α-galactosidase would have a sparing effect on supplemented levels of proteins and crystalline amino acids. Such a sparing effect would permit nutritionists to decrease the cost of poultry diets.

EXAMPLE 1

Two thousand four hundred straight run Ross x Hubbard HY commercial broiler chicks were randomly distributed among 24 identical pens. A total of 100 chicks (50 males and 50 females) were placed in each pen to provide a 0.75 density. Twelve pens were randomly allocated to either control starter, grower, and finisher basal diets without the enzyme supplement, or basal diets supplemented with an enzyme supplement including 30% α-galactosidase by weight. The basal diets used contain a nutrient profile which is representative of those used commercially. The nutrient and ingredient composition of the diets are outlined in Table 1.

TABLE 1

Composition and Calculated Nutrients of Diets

|  | Starter (%) | Grower (%) | Finisher (%) |
|---|---|---|---|
| Ingredients |  |  |  |
| Corn | 62.89 | 64.35 | 70.53 |
| Soybean Meal | 23.02 | 18.88 | 13.00 |
| Fish Meal (Menh.) | 5.00 | 5.00 | — |
| M&B Meal | 4.05 | 3.00 | 5.00 |
| Poultry Fat | 2.15 | 1.79 | 1.77 |
| Bakery Meal | 1.25 | 5.00 | 5.00 |
| Limestone | 0.26 | 0.36 | 0.38 |
| MHA[1] | 0.19 | 0.23 | 0.16 |
| Salt | 0.26 | 0.23 | 0.20 |
| Vit. & Min. Premix | 0.075 | 0.075 | 0.0625 |
| Analysis |  |  |  |
| Met. Energy, kcal/kg | 3124 | 3157 | 3179 |
| Crude protein (%) | 22.00 | 19.00 | 17.00 |
| Calcium (%) | 0.85 | 0.84 | 0.75 |
| Avail. Phos. (%) | 0.43 | 0.43 | 0.38 |
| Lysine (%) | 1.265 | 1.02 | 0.79 |
| TSAA[a] (%) | 0.84 | 0.815 | 0.685 |

[1]Methionine hydroxy anaolog
[a]Total sulfur amino acid

All of the rations were manufactured in a commercial feed mill, and were produced in the form of crumbles. The enzyme supplement was added by spraying on a mixture of 112 g of enzyme supplement and 888 g of water per ton of feed, resulting in a ration having 34 g of α-galactosidase per ton or an α-galactosidase activity level of 23,500 units per ton. Three hundred pound batches of feed were weighed into a horizontal mixer, mixed with 150 g mixture of the enzyme supplement for approximately 2.5 minutes, and split evenly among the various treatment pens. Samples were taken for subsequent enzyme activity determinations.

The feeding program consisted of the starter, grower, and finisher diets being fed from 0–20, 21–35, and 36–45 days of age, respectively. Feed was provided ad libitum. Commercial type watering, feeding, lighting, and husbandry programs were employed throughout the study. At 45 days of age, birds were group weighed by pen, counted, and feed was weighed to determine average body weights, feed conversion, and mortality. Twenty-four males and 24 females broilers from the control and α-galactosidase treatment were weighed individually, and sacrificed for subsequent carcass measurements.

As reported in Table 2, body weights at 45 days of age for birds in the control and α-galactosidase treatments were 2.25 and 2.36 kg, respectively. The increased body weight observed in Table 2 indicates that the possible nutrient liberation from α-galactosidase may have elevated the plane nutrition to a level which allowed the birds to begin to reach their genetic potential. The implications from these findings are that, depending on the production objectives, broilers can be fed a significantly lower plane of nutrition, which will reduce feed cost, and still attain competitive growth rates. Conversely, production of broiler meat can be expedited by the higher plane of nutrition provided by α-galactosidase supplementation, while improving feed utilization.

Feed conversions were adjusted for mortality, and standardized to a 2.27 kg weight. Results, as reported in Table 2, are a conversion rate of 1.94 for the control ration and 1.86 for the supplemented ration. When feed conversion is adjusted for mortality, the results for the control and α-galactosidase treated birds were 1.93 and 1.89, respectively. The improvements in feed conversion induced by α-galactosidase supplementation demonstrate that α-galactosidase enhances feed utilization most likely by liberating macro and micro nutrients which would otherwise be unavailable (indigestible) to broilers. The net effect appears to be an instantaneous increased plane of nutrition and assimilation of nutrients. It can be postulated that the increased availability of nutrients induced by α-galactosidase (see Table 3) could decrease the metabolic requirements during the digestive process. This would result in a better utilization of nutrients for other metabolic functions such as growth.

TABLE 2

The Effects of α-galactosidase on Broiler Performance at 45 days

|  | Control | α-galactosidase |
|---|---|---|
| Body Wt. (kg) | 2.25[a] | 2.36[b] |
| Feed Conv. | 1.93[a] | 1.89[a] |
| Feed Conv. Adj. Wt. | 1.94[a] | 1.86[b] |
| Livability (%) | 94.02[a] | 92.37[a] |

[a–b]means within a row with no common superscript differ significantly (P < .05)

TABLE 3

The increased availability of nutrients induced by α-galactosidase

|  | Reducing Sugars (mM glucose) | Soluble Proteins (μg/ml) |
|---|---|---|
| Control | 4.6 | 1726 |
| α-galactosidase | 23.1 | 2791 |

To conduct an assay of the reducing sugars, four reagents are needed. A reagent of 0.1M sodium acetate buffer (pH 5.0) is made by first dissolving 8.16 g sodium acetate in 950 mL deionized water. The pH is adjusted to 5.0 with glacial acetic acid. A 3,5 dinitrosalicylic acid (DNSA) reagent is made by dissolving 1 g sodium hydroxide in 97.75 g deionized water. To this solution, 1 g 3,5 dinitrosalicylic acid is added and stirred to dissolve the DNSA. Then, 0.05 g sodium sulfite and 200 µL phenol are added and the solution is mixed well. A 40% Rochelle salt reagent is made by adding 40 g potassium sodium tartrate (Rochelle salt) to 60 g deionized water and stirred to dissolve the Rochelle salt. Finally, a 10 mM glucose solution is made by adding 0.045 g glucose to 25 mL of the sodium acetate buffer.

An appropriate amount of sodium acetate buffer is pipetted into each test tube to achieve the correct dilution factor for the individual sample in a total volume of 1 mL (i.e., for a 100× dilution, use 990 µL buffer and 10 µL sample). Pipet the appropriate amount of sample into each tube. Mix well.

A standard curve as shown in the following table is prepared:

| Std. Concentration (mM glucose) | Vol. of 10 mM glucose (µL) | Vol. of Sodium Acetate Buffer (µL) |
| --- | --- | --- |
| 0 | 0 | 1000 |
| 0.5 | 50 | 950 |
| 1.0 | 100 | 900 |
| 1.5 | 150 | 850 |
| 2.0 | 200 | 800 |

To develop the color, add 1 mL DNSA solution to each tube of samples and standards. Place tubes in a boiling water bath for 15 minutes to allow color to develop. Remove tubes from boiling water bath and immediately add 400 µL Rochelle salt. Mix well. Allow tubes to cool before reading on the spectrophotometer. For the spectrophotometric measurement, read each tube at 575 nm, beginning with standards to establish a line of regression. Use the above standard curve to calculate the concentration of reducing sugars in each sample tube suing the following formula:

dilution factor x concentration from std. curve= concentration in sample (mM glucose).

Samples were analyzed using the University of Iowa's standard HPLC method for amino acid analysis. Hydrolysis of the sample for analysis is accomplished with either performic acid or hydrochloric acid. Injection volume is 0.05 mL.

Broilers in the control treatment had heavier abdominal fat pad weights, as a percent of the live weight, than birds in the α-galactosidase group (Table 4). The magnitude of this increase was 8.8% (1.82% vs. 1.66%). Conversely, a significant increase in breast and thigh meat yield of 5.0% and 2.8%, respectively, was observed in the α-galactosidase treated broilers when compared to the controls. It is a well established fact that protein or amino acid supplementation above baseline levels will induce a shift from lipogenic activity to protein accretion in broilers. The result of such nutrient partitioning are leaner birds with a proportionate increase in meat yield. The improvement in meat yield, and the concurrent decrease in fat deposition observed in this study would support the theory that α-galactosidase's exogenous enzymatic activity on a corn/soybean based diet liberates proteins and amino acids, which are then utilized by broilers to increase meat yield.

TABLE 4

The Effects of α-galactosidase on Carcass Measurements

| | Control | α-galactosidase |
| --- | --- | --- |
| Live wt. (kg) | 2.35[a] | 2.45[a] |
| WOG (%) | 66.50[a] | 66.90[a] |
| Fat Pad (%) | 1.82[a] | 1.66[a] |
| Pectoralis Major & Minor (%) | 12.08[a] | 12.72[b] |
| Thigh (%) | 12.63[a] | 13.00[b] |

[a–b]means within a row with no common superscript differ significantly (P < .05).

EXAMPLE 2

Trial 1: The performance of broilers fed an enzyme-supplemented diet was compared to those fed a basal diet over the six-week duration of the trial. Performance was monitored by the measurement of feed conversion, body weight and percent mortality. Four hundred male broiler chicks were randomly assigned to 20 floor pens with 20 birds per pen, thus providing 10 repetitions per treatment. The experimental enzyme product was used at an application rate of 150 g/ton of finished feed. As in Example 1, 112 g of the enzyme concentrate was diluted with potable water to create one liter of a solution that was then sprayed onto the mash feed as it mixed.

A three-feed program was used in which the starter diet was fed for 21 days, the grower from day 21 to 35, and the finisher/withdrawal from day 35 to the conclusion of the trial at 42 days. A coccidiostat (Coban®-60 brand menosnsin sulfate from Lily) was incorporated into the starter and grower diets at the rate of 0.075%. Feed and water were available ad libitum over the duration of the study. Nutrient specifications and composition of the diets are outlined in Table 5 below.

TABLE 5

COMPOSITION AND NUTRIENT SPECIFICATIONS OF DIETS

| Ingredient/Nutrient | Starter (%) | Grower (%) | Finisher (%) |
| --- | --- | --- | --- |
| Corn (%) | 56.71 | 61.47 | 67.89 |
| Soybean Meal 48 (%) | 34.45 | 30.1 | 24.34 |
| Fat (%) | 4.66 | 4.54 | 4.13 |
| Calcium Carbonate | 1.66 | 1.57 | 1.50 |
| Mono, Dical Phosphate | 1.59 | 1.44 | 1.37 |
| Salt | 0.38 | 0.38 | 0.38 |
| Vitamins | 0.25 | 0.25 | 0.25 |
| D, L-Methionine | 0.17 | 0.17 | 0.096 |
| Minerals | 0.05 | 0.05 | 0.05 |
| Coban ® 60 | 0.075 | 0.075 | — |
| Protein (%) | 22.0 | 20.0 | 18.0 |
| Energy (Kcal/kg) | 3124 | 3168 | 3212 |

Birds and feed were weighed weekly. Mortality was recorded daily and early losses (in the first four days of the study) were replaced. Dead birds were weighed to calculate a mortality-corrected feed conversion. Data was analyzed by analysis of variance (ANOVA). Treatment means were separated by means of a Duncan's multiple range test.

Trial 2: A trial was conducted at a poultry research facility to determine performance as measured by feed conversion rates, body weight gain and percent mortality. Nine hundred and sixty Ross x Cobb broilers were randomly placed in 24 pens, with 20 males and 20 females in each pen. The four treatments in this trial consisted of the control diet and the control diet with enzyme supplementation at 75 g/ton, 112.5 g/ton and 150 g/ton. This scheme provided for six repetitions per treatment. As in Trial 1, the enzyme concentrate was diluted with potable water to 1 l and sprayed on the feed as it mixed.

Broiler starter, grower and finisher rations were used in this trial. The starter diet was fed to day 21, the grower from day 21 to 38, and the finisher from day 38 to the conclusion of the trial at 49 days. The diets in this study are those set out in Table 5. The starter ration was fed as a crumble, the grower and finisher as short pellets. Feed and water were provided ad libitum for the duration of the study. A coccidiostat (Coban®-60) was included at the rate of 0.075% in the starter and grower diets. Birds and feed were weighed on a weekly basis. Mortalities were recorded as they occurred and were used to correct feed conversion. Data was analyzed by ANOVA and treatments were separated using a Duncan's multiple range test.

The two broiler trials were conducted in order to evaluate the performance of the α-galactosidase enzyme system developed for corn/soybean meal diets. In the first trial, a control diet was compared against a diet supplemented with α-galactosidase. The second trial was a dose/response experiment where α-galactosidase was applied at increasing inclusion levels. For both experiments feed conversion, body weight and mortality were monitored weekly.

The results of Trial 1 α-galactosidase supplementation in feed conversion and body weight at six weeks of age are set out in Table 6 below.

TABLE 6

BODY WEIGHT AND FEED CONVERSION AT SIX WEEKS

|  | Control | α-galactosidase @ 45 g/ton |
|---|---|---|
| Body Weight (g) | 2191.7[b] | 2185.9[b] |
| Feed/Gain | 1.95[a] | 1.84[b] |

[a,b]Means within a row with different superscripts are statistically different ($p < 0.05$).

At six weeks, enzyme supplementation of the feed resulted in an 11-point improvement in feed conversion. No statistical difference in body weight was seen.

The cumulative weekly feed conversions for the six-week duration of the trial are illustrated in FIG. 1. Beginning in week five of the trial, feed conversions for the enzyme-supplemented test group showed a statistical improvement over the control group ($p<0.05$). This trend continued in week six, resulting in an improvement of 11 points. The average percent mortality over the six-week duration of the trial was 9.5% for the control group, and 6.0% for the enzyme-supplemented group. These values were not statistically different.

In Trial 2, α-galactosidase supplementation was tested at various inclusion levels in order to determine the optimum application level. Final feed conversions and body weights for all treatment groups are set out in Table 7.

TABLE 7

BODY WEIGHT AND FEED CONVERSION AFTER SEVEN WEEKS

|  | Control | α-galactosidase @ 22.5 g/ton | α-galactosidase @ 33.8 g/ton | α-galactosidase @ 45 g/ton |
|---|---|---|---|---|
| Body Weight (g) | 2950.1 | 3008.7 | 2989.6 | 3009.1 |
| Feed/Gain | 1.922[a] | 1.905[ab] | 1.873[c] | 1.897[ab] |

[a,b,c]Means within a row with different superscripts are statistically different ($p < 0.05$).

After seven weeks, enzyme supplementation resulted in feed conversion improvements in the range of 1.7 to 4.9 points, with the 4.9-point improvement being statistically significant. As in Trial 1, no statistical improvement in body weight was observed. Cumulative weekly feed conversions and body weights are illustrated in FIG. 2. As in Trial 1, the full benefit in feed conversion with enzyme supplementation was observed in the latter stages of the trial. The average percent mortality over the seven-week duration of the trial was 11.5% for the control group and 11.25%, 9.17% and 10%, respectively, for the treatment groups. The mortality figures were not statistically different. The primary causes of mortalities in this trial were ascites and sudden death syndrome.

Table 8 sets out the release of reducing sugars and soluble proteins from enzyme-treated feed in this Example 2.

TABLE 8

The increased availability of nutrients induced by α-galactosidase

|  | Reducing Sugars (mM glucose) | Soluble Proteins ($\mu$g/ml) |
|---|---|---|
| Control | 5.4 | 2041 |
| α-galactosidase |  |  |
| Replicate 1 | 21.7 | 3609 |
| Replicate 2 | 21.8 | 3494 |
| Replicate 3 | 21.3 | 3450 |

Table 9 sets out the increased amino acid liberation induced by feed supplemented with α-galactosidase.

TABLE 9

The increased liberation of amino acids induced by α-galactosidase

| | Amino Acid Release ($\mu$g/ml) | | | | | |
|---|---|---|---|---|---|---|
| | Example 1 | | Example 2 | | | |
| Amino Acid | Control | Treatment | Control | Treatment 1 | Treatment 2 | Treatment 3 |
| Phe | 75.00 | 145.20 | 81.61 | 173.07 | 178.48 | 154.89 |
| Val | 67.76 | 121.14 | 76.62 | 142.48 | 153.90 | 128.11 |

TABLE 9-continued

The increased liberation of amino acids induced by α-galactosidase

| | Amino Acid Release (μg/ml) | | | | | |
|---|---|---|---|---|---|---|
| | Example 1 | | Example 2 | | | |
| Amino Acid | Control | Treatment | Control | Treatment 1 | Treatment 2 | Treatment 3 |
| Thr | 68.12 | 110.04 | 74.31 | 128.12 | 133.41 | 117.03 |
| Ile | 60.38 | 114.18 | 68.33 | 133.69 | 143.41 | 120.82 |
| Met | 23.97 | 30.19 | 21.83 | 30.65 | 32.07 | 28.93 |
| His | 46.35 | 82.29 | 49.25 | 92.94 | 94.65 | 85.15 |
| Arg | 181.05 | 318.31 | 182.91 | 371.84 | 374.39 | 337.41 |
| Lys | 129.67 | 231.48 | 152.04 | 277.28 | 290.13 | 252.26 |
| Leu | 97.48 | 187.98 | 108.38 | 226.84 | 235.79 | 204.22 |
| Cys | 23.14 | 30.38 | 25.73 | 36.30 | 37.22 | 34.83 |

In experimental trials and field trials conducted to date, α-galactosidase has been clearly shown to improve the feed/gain ratio by approximately six points. Other benefits, such as improved livability, body weight gains and improved relative breast meat yields were also observed, indicating enhanced availability and utilization of dietary nutrients and, possibly, a repartitioning effect favoring the development of breast muscle over fat pads. The experimental results in Tables 8 and 9 furnish supporting evidence for these in vivo observations and provide clear evidence for the likely mode of action of α-galactosidase. The direct release of additional sugars form indigestible polysaccharides provides additional energy to the birds. In addition, the removal of the anti-nutritional α-galactosides may positively impact the metabolic functions of the bacterial flora and improve residence time and nutrient utilization from all diet ingredients including fats and proteins.

The results of the trials indicate substantial economical benefits for broiler producers when α-galactosidase supplementation is used in a high corn/soybean meal diet. Significant improvements in feed conversion of up to 11 points were observed in the first trial. In the second trial, an improvement of 4.9 points in feed conversion was obtained at the recommended application level of 33.8 g/ton, which can represent an economical benefit of 50 cents/lb reduction in feed costs.

Although the invention has been described with respect to a preferred embodiment thereof, it is to be also understood that it is not to be so limited since changes and modifications can be made therein which are within the full intended scope of this invention as defined by the appended claims.

We claim:

1. A method to increase the yield of white meat and decrease the deposition of fat in chicken, by feeding said chicken a chicken feed composition comprising:
   (a) protein, vitamins and minerals;
   (b) a source of carbohydrates comprising a galactoside selected from the group consisting of soybeans and corn; and
   (c) an α-galactosidase that catalyzes the degradation of the galactoside, where the addition of the α-galactosidase increases the amount of white meat, and decreases the amount of fat deposited during growth of a chicken fed the feed composition, relative to the chicken fed on an identical feed composition absent the α-galactosidase.

2. A method according to claim 1, wherein the galactosidase is added to the feed composition to increase the amount of galactosidase by between about 22.5 grams per ton and about 75 grams per ton.

3. A method according to claim 1, wherein the galactosidase is added to the feed composition to increase the amount of galactosidase by between about 30 grams per ton and about 45 grams per ton.

4. A method according to claim 1, wherein said increase in white meat is between about 1% and about 10%.

5. A method according to claim 1, wherein said decrease in fat deposition is between about 1% and about 20%.

6. A method to increase the yield of white meat and decrease the deposition of fat in poultry, by feeding said poultry a feed composition comprising:
   (a) protein, vitamins and minerals;
   (b) a source of carbohydrates comprising a non-starch polysaccharide selected from the group consisting of soybeans and corn; and
   (c) an enzyme that catalyzes the degradation of the non-starch polysaccharide, where the addition of the enzyme increases the amount of white meat and decreases the amount of fat deposited during growth of a poultry animal fed the feed composition relative to the animal fed on an identical feed composition absent the enzyme.

7. A nutritive method for feeding a poultry animal, to increase the yield of white meat and decrease the deposition of fat in the poultry, comprising the steps of:
   (a) preparing a feed composition comprised of protein, vitamins, and minerals, and further comprising a carbohydrate source comprised of a galactoside selected from the group consisting of soybeans and corn; and
   (b) supplementing the feed composition with a galactosidase that catalyzes the degradation of the galactoside, where the addition of said galactosidase increases the amount of white meat and decreases the amount of fat deposited during growth of a poultry animal fed the feed composition relative to the poultry animal fed on an identical feed composition absent the galactosidase.

8. A nutritive method according to claim 7, wherein the galactosidase is added to the feed composition to increase the amount of galactosidase by between about 22.5 grams per ton and about 75 grams per ton.

9. A nutritive method according to claim 7, wherein the galactosidase is added to the feed composition to increase the amount of galactosidase by between about 30 grams per ton and about 45 grams per ton.

10. A nutritive method according to claim 7, wherein said increase in white meat is between about 1% and about 10%.

11. A nutritive method according to claim 7, wherein said decrease in fat deposition is between about 1% and about 20%.

12. A nutritive method according to claim 7, wherein said galactosidase is α-galactosidase.

* * * * *